United States Patent Office 3,238,342
Patented Mar. 1, 1966

3,238,342
ELECTRICAL-CONTACT FAILURE INHIBITION
Saul W. Chaikin, Menlo Park, Calif., assignor to Stanford Research Institute, Menlo Park, Calif., a corporation of California
No Drawing. Filed Nov. 5, 1964, Ser. No. 409,312
8 Claims. (Cl. 200—166)

The present invention relates to electric contacts, and more particularly to electric contacts which are used to make frequent interruptions (i.e. "make-and-breaks") in electric circuits.

In one of its most specific embodiments, the invention pertains to sealed relays, and to the inhibitions of failures therein, these failures being presumably caused, or at least aggravated, by the presence in said sealed relays of organic contaminants.

Electric contacts which are caused to make and break contacts frequently are subjected to severe operating conditions. Thus, relays, potentiometers, commutators, and cable connectors are illustrative examples of electric connecting or contact devices in which contact contamination can and does frequently cause electrical-contact failures. The problem is intensified by the growing use of equipment which must operate dependably in low signal level systems as well as in systems which operate, whether continuously or with intervening lengthy storage periods, at moderate signal levels. One such system in which repeated and/or continuous operation has been found to cause electrical-contact failure presumably at least in part due to contact surface contamination comprises the miniature and subminiature sealed relays, such as those employed in telephone communication systems.

Without any intention of being limited by any theory, it is presently believed that organic insulations and other plastic relay parts within the sealed relays (or like electric contact devices) evolve organic, and possibly hydrocarbon gases or vapors, which latter apparently react with the contact metals to produce a non-conducting deposit on the contact surfaces. One such non-conducting deposit is the organic deposit, called frictional polymer, which forms at the rubbing site within a sealed relay or in a like sealed electric contact device. Such frictional polymer is especially formed in sealed relays in which the contacts are made of, or at least provided with a surface of a metal of the platinum family, e.g., platinum, palladium.

The formation of the aforementioned frictional polymer has been found to occur at the rubbing sites when the mentioned metals of the platinum family are rubbed together, e.g., in the manner in which contacts are made and broken in sealed relays, in the presence of organic vapors, much as those produced or evolved in sealed relays by organic insulations or parts used in sealed relays. Again, without being limited to any theory, it is presently the inventor's opinion that the rubbing of the metal surfaces in a sealed relay, or the like, possibly causes emission of electrons from and by the metal surfaces, and that these electrons probably cause chemical changes in the hydrocarbons in the vicinity. Since at least some, if not all of the metals of the platinum family are catalysts capable of causing reactions in organic compounds, it is believed that the frictional polymer is quite likely produced (in the sealed relays and the like) by some combination of the effects of catalysis and of electron emission from the rubbed surfaces in the sealed contact-producing devices which have the rubbing metals surrounded by (and therefore in contact with) gases or vapors evolved by organic insulators, etc. Whatever might be the theory, the fact remains that the aforementioned connecting devices, e.g., sealed relays using contacts of metals of the platinum family do generate organic contaminants which cause electrical-contact failures. Also various methods and means heretofore proposed to overcome this difficulty have been insufficient, uneconomical and/or impractical.

It is therefore an object of the present invention to avoid the above and other defects, and to provide a method and means to inhibit contaminations of (and therefore electrical-contact failure in) electrical connecting devices of the type of sealed relays, commutators, and the like. It is a further object of this invention to inhibit the formation of the so-called frictional polymers in sealed connecting devices, e.g., sealed relays, while frictional polymers, as previously indicated are produced in such sealed devices wherein metals of the platinum family are employed to make (or at least provide the surface on) the moving, e.g. sliding, parts. It is still another object of the invention to provide means for inhibiting the polymerization, in sealed relays, of organic gases or vapors, e.g., hydrocarbon vapors, which are present in said sealed relays by being formed or evolved from plastic relay parts and other organic insulators in the relays, said polymers causing excessive resistance and therefore failure of the contact devices.

It has now been discovered that the above and other objects may be attained by providing the space surrounding the contact elements (specifically, the contact members made of or coated with metals of the platinum family) with vapors of certain substances or compounds having definite and specific characteristics. Generally speaking, these substances or compounds comprise or include iodine as well as the lower hydrocarbyl iodides. Of this latter class of compounds, it is generally possible to use all hydrocarbyl iodides which will form a vapor in the space surrounding the metal contacts of a sealed relay or of like sealed contact devices, as well as those lower iodides which decompose under said operating conditions to form an iodine vapor in the aforementioned space.

It has also been discovered that even very low concentrations of iodine and/or of the aforementioned lower hydrocarbyl iodides in the vapor space surrounding the metal contacts is generally sufficient to effect the necessary or desirable inhibition of the aforesaid polymerization in sealed relays or the like. It has been also discovered that effective inhibition of the stated polymerization may be attained when the concentration of the iodine and/or of the aforementioned lower hydrocarbyl iodides in the sealed vapor space surrounding the metal contacts of relays is as low as about 10 micrograms per liter of vapor space (when measured at about 25° C.).

The invention may therefore be stated to reside in a process for inhibiting or preventing failures in sealed electrical devices which contain electrical contacts made of or provided with surfaces of a metal of the platinum family, which contacts are caused to make and break contact frequently, this inhibition of failure being effected, in accordance with the process of the present invention, by providing, in the space within the sealed electric device and around the electric contacts therein, a compound capable of inhibiting the formation of organic friction polymers, said compound being selected from the group consisting of iodine and lower hydrocarbyl iodides capable of existing as a vapor under the operating conditions within said space surrounding the sealed electrical contacts.

In one of its more specific embodiments the invention resides in a process for inhibiting the formation of organic friction polymers in sealed relays having contacts made of or coated with a metal of the platinum family, said process comprising the provision, within the sealed space surrounding said relay contacts, of a compound selected from the group consisting of iodine and of lower hydrocarbyl iodides capable of existing as a vapor under the operating conditions within said space surrounding the said sealed electrical relay contacts.

It was stated that lower hydrocarbyl iodides are highly suitable for inhibiting the formation of organic friction polymers, and particularly hydrocarbyl polymers, in sealed relays and like sealed electrical contacting devices in which the metallic moving members consist of or comprise metals of the platinum family. Without any intention of being limited by the compounds specifically enumerated herein; it may be stated that representative compounds of this group include the following lower aliphatic and aromatic mono- and di-iodides: methyl iodide, ethyl diiodide, methylene iodide, ethylidene iodide, propylene iodides, allyl iodide, monoiodobenzene, mono-iodomethyl benzenes, monoiodoethylbenzenes, benzyl iodide, 1-phenyl-3-iodo-propene-1, and the like, and their homologues and analogues. It is generally preferred to select and use those hydrocarbyl iodides which provide a sufficiently high concentration of vapors of the iodide and/or iodine at the temperatures and pressures existing in the sealed space surrounding the metal contacts of the contacting devices to be treated according to the process of the present invention. At least in part, the desired or necessary concentration of iodine and/or iodide vapor space of the sealed device (e.g. relay) will depend on the concentration of the organic polymer-forming material, e.g. hydrocarbon, in said vapor space. As stated above, however, the concentration of the iodine and/or iodide vapors in the vapor space of the sealed device, e.g. sealed relay, need not be high, satisfactory inhibition having been obtained when said concentration has been as low as about 10 micrograms per liter of vapor space (when measured at about 25° C.).

It has been at least implied that the amount of the iodine (or of the hydrocarbyl iodides) to be used in accordance with the process of the present invention to inhibit polymer formation in sealed electric contact devices, such as sealed relays, may vary within rather wide limits, and will at least in part depend on the particular inhibiting compound or substance employed, the type and concentration of the organic polymer-forming substance in the sealed-in space, as well as on the operating conditions, i.e. temperature, pressure, etc. therein. Thus, it was found that, other conditions being equal, greater and longer inhibition (as well as total suppression) of frictional polymer formation can be obtained by increasing the concentration of the particular inhibitor, e.g. iodine, in the vapor space of a sealed electric contact device. Also, the use of optimum amounts of iodine or of a given lower hydrocarbyl iodide not only inhibits polymer formation from the organic (e.g. hydrocarbyl) compounds present in the vapor space, but also permits good lubrication of the electric contacts, thus inhibiting not only polymer formation, but also wear of the contacts, which latter, as previously indicated, consist of or are at least coated with metals of the platinum family, i.e. platinum, iridium, osmium, palladium, rhodium, and ruthenium.

The invention is illustrated by the following examples which are presented herein for the purpose of showing the advantage derived from operating in accordance with the process of the present invention, and the results obtained thereby. It is understood, however, that these examples are merely illustrative of the invention and are not to be considered as limiting the invention in any sense.

Example I

In this example, as well as in the immediately succeeding examples described hereinbelow, a sealed electric contact device of the type of a commutator or relay, was simulated by providing a sealable tubular apparatus in which a palladium stylus was caused to ride against a palladium plate under controlled force. Both the rubbing and the application of force were accomplished with electric per second, and the latter with D.C. field. A standard 2-hour rubbing period and a contact force of 10 grams were employed.

In the instant case, a standard atmosphere of saturated benzene vapor was produced within the sealed apparatus by introducing and keeping therein (throughout the experiment) a dish of benzene. At the conclusion of a 2-hour rubbing the wear track on the palladium plate was found to be covered with a dark deposit. In order to compare the various deposits made under different conditions, they were rated visually, the heaviest deposits being rated by "10," i.e. ten, while "0" (zero) was assigned to a case where no or substantially no deposit was formed. In the experiment just described, the dark deposit was quite heavy, its relative quantity being equal to "10." Ninety percent (90%) of this product comprised or consisted of the abovementioned organic product formed by the polymerization of the benzene at the wear surface.

Example II

The above experiment was repeated with the same benzene atmosphere but having pure iodine crystals present in the sealed container. At the end of the 2-hour run, the dark deposit was just as heavy as in Example I. However this deposit contained only a very small amount (about 5%) of an organic (i.e. benzene) polymer, but consisted substantially exclusively of a product formed by the wear of the metal (i.e. palladium) subjected to frictional contact.

Example III

When Example II was repeated using a 1% solution of iodine (in a benzene-paraffine oil blend), the relative quantity of the total deposits was only 5, while less than 50% thereof was the detrimental organic polymer.

Example IV

When the run described in Example I was repeated using an apparatus in which a dish containing a mixture of 25% benzene and 75% of a paraffine oil was present in the sealed container the results were as follows:

| Inhibitor | Concentration (in benzene-paraffine oil), percent | Relative Quantity of Deposit | Percent of Organic Frictional Polymer |
|---|---|---|---|
| CH₂I₂ | 1 | 5 | less than 3 |
| CH₂I₂ | 10 | | 5 |

Example V

In this and the following examples, the sealable tubular apparatus used was substantially that described above with reference to the running of the experiment described in Example I. The main differences in the present apparatus and in its use are: Only the rubbing was accomplished by use of an electromagnet, the application of the probe force being effected by means of a spring, this contact force being equal to 40 grams. Also, the rubbing period was extended to 5 hours. Additionally, instead of using a dish of benzene (to provide an atmosphere of benzene within the sealed apparatus), the dish contained a solution of 75% benzene and 25% paraffin oil.

At the end of each of the 5-hour runs, the amounts of polymer produced were weighed. It was found that, when using no inhibitor, these amounts of polymer produced ranged from about 20 to about 35 micrograms.

Example VI

When the above runs were repeated with the same bencompounds present in the sealed container, the results obtained were as follows:

| Inhibitor: | Amount of polymer, micrograms |
|---|---|
| 2% propyliodide (in benzene-paraffin oil solution) | 7 |
| 2% butyl iodide (in benzene-paraffin oil solution) | 2 |
| 10% mono-iodobenzene (in benzene-paraffin oil solution) | 2 |

It was indicated that the concentration of the subject inhibitors in the vapor space of a sealed relay or the like may vary within wide limits, and that it may thus be varied by different means and methods obvious to those skilled in the art.

The "paraffin oil" used in some of the above examples was a refined saturated mineral oil having an initial boiling point of about 290° C. It was used for the sole purpose of lowering the partial pressure of the benzene employed in the tests.

I claim:

1. In a process for inhibiting frictional polymer formation in sealed electric contact devices, in which electric contacts have surfaces of a metal of the platinum family, and in which said contacts repeatedly make and break an electric circuit, the step of providing within said electric contact device a compound selected from the class consisting of iodine and lower hydrocarbyl iodides.

2. In a process for inhibiting frictional polymer formation in sealed electric contact devices, in which electric contacts are of a metal of the platinum family, and in which said contacts repeatedly make and break an electric circuit, the step of providing the vapor space surrounding said electric contacts with vapors from a compound selected from the class consisting of iodine and lower hydrocarbyl iodides.

3. The process according to claim 2, wherein the amount of the inhibitor compound employed is sufficient to saturate the vapor space surrounding the electric contact device.

4. A process for inhibiting formation of a frictional organic polymer in sealed electric relays in which the contacts are at least coated with a metal of the platinum family, which comprises providing the space within the sealed relay with a lower hydrocarbyl iodide capable of forming iodide vapors under the operating conditions existing within said sealed relay.

5. The process according to claim 4, wherein the iodide employed is methylene iodide.

6. The process according to claim 4, wherein the iodide employed is mono-iodo benzene.

7. The process according to claim 2 wherein the inhibitor compound used is iodine employed in an amount sufficient to saturate the vapor space surrounding the electric contact device.

8. The process according to claim 2 wherein the concentration of the inhibitor compound in the sealed vapor space surrounding the electric contacts is between about 10 micrograms per liter of vapor space (when measured at about 25° C.) and the saturation point of said inhibitor compound.

No references cited.

KATHLEEN H. CLAFFY, *Primary Examiner.*

H. JONES, *Assistant Examiner.*